Patented Apr. 7, 1942

2,278,644

UNITED STATES PATENT OFFICE 2,278,644

PROCESS FOR THE REGENERATION OF CATALYSTS CONTAINING THORIUM

Karl Büchner, Duisburg-Hamborn, Germany, assignor, by mesne assignments, to Hydrocarbon Synthesis Corporation, Linden, N. J.

No Drawing. Application June 26, 1939, Serial No. 281,152. In Germany July 1, 1938

6 Claims. (Cl. 23—23)

In the synthesis of hydrocarbons with more than one carbon atom in the molecule from gases comprising carbon monoxide and hydrogen, thorium has hitherto been recovered from exhausted catalysts containing thorium, for example, beside cobalt and/or nickel, by treating said catalysts with dilute nitric acid and subsequently precipitating thorium from the solution thus obtained by means of sodium carbonate.

It has, however, been observed that when the thorium thus recovered was re-employed for the preparation of catalysts, these catalysts did not always have a satisfactory activity in said synthesis. This was more particularly the case when the catalytic materials were regenerated from catalysts containing carriers, such as, for example, kieselguhr.

I have now found that catalysts containing thorium having a uniformly satisfactory activity in said synthesis of hydrocarbons from gases comprising carbon monoxide and hydrogen can be prepared with thorium recovered from exhausted catalysts if said recovery is carried out by treating the exhausted catalysts with a mineral acid to dissolve the thorium, and, if desired, the other catalyst constituents, precipitating from the acid solution thus obtained a sludge containing a large amount of thorium, dissolving said sludge in sulphuric acid, precipitating the thorium from the sulphuric acid solution thus obtained as thorium-potassium sulphate, separating the thorium-potassium sulphate from the solution, preparing an insoluble thorium carbonate from the sulphate, and recovering said carbonate.

This insoluble thorium carbonate is usually obtained in the form of thorium hydrocarbonate.

The unsatisfactory activity of the catalysts prepared with thorium in the manner hitherto employed for recovering was apparently due to the fact that this thorium contained iron in disturbing amount. When working according to the present invention the thorium recovered contains substantially no iron or only a small amount of iron.

The present invention will now be described in greater detail:

The treatment of the exhausted catalyst with a mineral acid to dissolve the thorium and other catalyst constituents is advantageously carried out in accordance with the U. S. Patent application Serial No. 230,510.

The sludge containing a large amount of thorium is as a rule precipitated from the mineral acid solution obtained in accordance with this application by the addition of a solution of soluble carbonates, in particular alkali metal carbonates such as sodium carbonate. If the solution contains other catalyst constituents such as cobalt or nickel it is desirable to add only so much alkali metal carbonate solution and to carry out this addition so slowly that the precipitate contains a large amount of thorium but that the bulk of the other catalyst constituents remains in solution.

In this way a sludge containing mainly thorium and iron, for example, in the proportions of about 1 to 3 may be precipitated. The precipitation may be carried out at suitably elevated temperatures, for example, at about 60° to 70° centigrade.

The solution from which the sludges has been separated and which usually contains the bulk of the catalyst constituents, such as cobalt, may be further treated in order to recover these constituents if this is desired.

After dissolving said sludge in sulphuric acid, potassium sulphate or, if desired, a mixture of potassium sulphate and sodium sulphate in which the former is present in predominating amounts, may be added to the acid solution, preferably while stirring, so that thorium is precipitated as thorium-potassium sulphate but the iron remains dissolved. In place of potassium sulphate mixtures furnishing potassium sulphate may be employed for precipitating the thorium-potassium sulphate as, for example, potassium chloride and sodium sulphate or potassium chloride and sulphuric acid. The precipitate is separated from the solution, for example, by filtration and preferably thoroughly washed, advantageously with a saturated potassium sulphate solution, in order to remove the adhering parts of the solution in which iron is contained.

The conversion of thorium-potassium sulphate into insoluble thorium carbonate may be carried out in different ways. For example, said carbonate may be obtained by boiling the thorium-potassium sulphate with a concentrated solution of a carbonate of an alkali metal or of ammonium. Particularly good results regarding the separation from the iron and ultimately the activity of the regenerated catalyst, are obtained if the reaction mixture contains during said conversion more potassium sulphate than sodium sulphate or at least equal amounts by weight thereof. For example, when employing a sodium carbonate solution for the conversion, potassium sulphate may be added as such or in form of a solution, before or during said conversion, which is effected according to the equation:

$$(Th(SO_4)_3)K_2 + 2Na_2CO_3 = Th(CO_3)_2 + 2Na_2SO_4 + K_2SO_4$$

so that without the addition of potassium sulphate, more sodium sulphate would have been present. Also a solution containing both sodium- and potassium-carbonate may be employed with advantage in place of sodium carbonate alone, in order to increase the proportion of potassium sulphate to sodium sulphate in the reaction mixture.

In order to obtain even more favourable results regarding the separation of iron and the catalyst activity the conversion of the thorium-potassium sulphate into thorium carbonate may be carried out by treating it with such an excess of alkali metal carbonate or ammonium carbonate solution that the thorium carbonate first precipitated is redissolved and by then heating the solution obtained, e. g. to about 90° centigrade, so that the iron hydroxide colloidally contained in solution is precipitated. After the precipitate has been removed, for example, by filtration thorium hydrocarbonate is precipitated from the solution by addition of acid, for example, sulphuric acid or hydrochloric acid.

The iron hydroxide precipitated as aforesaid usually contains a small amount of thorium and therefore this precipitate may be treated again for the recovery of thorium together with fresh sludge to be dissolved in sulphuric acid, in accordance with the present invention.

The alkali metal sulphates contained in the solution obtained by the aforesaid conversion of thorium-potassium sulphate may be separated therefrom, for example, by cooling to low temperatures, such as, for example, −5° to −10° centigrade, and may be used again in the process.

According to the process of the present invention thorium is recovered from the exhausted catalysts in a sufficiently purified form for further use in the manufacture of catalysts with satisfactory activity.

Thus if thorium carbonate is obtained by conversion of thorium-potassium sulphate according to the proposed process, by boiling up the same with a concentrated sodium carbonate solution as stated above, it contains only about 0.8–1.0 parts by weight of iron oxide (calculated as $Fe_2O_3$) in 100 parts by weight of thorium compound (calculated as $ThO_2$). When adding potassium sulphate during said conversion in amounts as above defined a thorium carbonate of higher purity can be obtained, for example containing less than 0.3 part of iron oxide in 100 parts of thorium compound (calculated as stated above).

When thorium carbonate is prepared by precipitation from a purified solution of thorium-potassium sulphate in a carbonate solution as set forth above, the thorium is obtained practically free from iron, for example, containing in 100 parts less than 0.1 part of iron oxide (calculated as stated above).

The recovered thorium is dissolved in nitric acid and the thorium nitrate solution obtained is employed in the preparation of catalysts for the synthesis of hydrocarbons by interaction of hydrogen and carbon monoxide.

The following examples further illustrate the nature of the present invention and in what manner the same can be carried out in practice, but it should, however, be understood that the invention is not limited to said examples.

*Example 1*

360 kilograms of a moist sludge containing 50 kilograms of thorium calculated as thorium oxide, precipitated by the addition of the first portions of a sodium carbonate solution from a nitric acid solution obtained in the recovering of an exhausted thorium containing catalyst, which has been employed in the synthesis of hydrocarbons from carbon monoxide and hydrogen, are introduced while cold into 720 litres of 4-normal sulphuric acid, and are dissolved while stirring. Then 150 kilograms of potassium sulphate and 100 kilograms of sodium sulphate are introduced into the solution which is then stirred for about 1½ hours. Thereby thorium-potassium-sulphate-double-salt is precipitated and is separated from the iron-containing solution. The double salt is washed with a potassium sulphate solution which has been saturated at room temperature, until the washing liquid contains merely traces of iron. The practically iron-free double salt is thereupon admixed with a little water and heated to about 90° centigrade and a sodium carbonate solution having a concentration of about 200 grams per litre is added while stirring, until the pH value remains constant at 7.5 to 8.0. For this purpose about 60 kilograms of sodium carbonate are required. The thorium hydrocarbonate thus obtained is separated by filtration, washed with hot water until it is free from sulphate and dissolved in 60 percent nitric acid; thereafter the solution thus obtained is filtered. This solution is then employed in the preparation of catalyst for the hydrocarbon synthesis; the activity of these catalysts is equal to the activity of those catalysts from which they have been regenerated.

*Example 2*

360 kilograms of the same sludge as used in Example 1 are introduced into a mixed solution which consists of 160 litres of concentrated sulphuric acid, 170 litres of a solution of potassium sulphate of slightly acid reaction, which has been used for the washing of thorium-potassium sulphate and 410 litres of a solution which has been used in the conversion of thorium-potassium sulphate. Thereupon 20 kilograms of potassium sulphate are added and after stirring for about 1½ hours, the precipitated thorium-potassium sulphate is separated and further worked up into catalysts, as stated in Example 1.

Having now particularly described and ascertained the nature of my invention and in what manner the same is to be performed, I declare that what I claim is:

1. In the process of recovering thorium values of high catalytic activity, practically free from Fe, Ni, Co, $Al_2O_3$ and $SiO_2$, from the spent thorium catalysts containing substantial amounts of iron such as used in the production of hydrocarbons from CO and $H_2$, the steps of treating such catalysts at a moderately elevated temperature with a mineral acid to extract the catalytically active constituents, adding to the acid solution resulting in this treatment a soluble carbonate to produce a precipitate rich in thorium, dissolving said precipitate in sulfuric acid, precipitating the thorium from the sulfuric acid solution under the form of thorium potassium sulfate and converting this double sulfate into insoluble thorium hydrocarbonate.

2. The process of claim 1, in which precipitation of the thorium-potassium double salt is brought about by means of a compound reacting with sulfuric acid to form potassium sulfate.

3. The process of claim 1, in which the precipitation of the thorium-potassium double salt is brought about by means of a mixture of potassium and other compounds, the potassium compound predominating in the mixture.

4. The process of claim 1, in which the addition of a soluble carbonate to the mineral acid solution containing the extracted catalytically active constituents is so controlled as to quantity and speed, as to precipitate practically all the thorium, while leaving in the solution the bulk of other catalytically active constituents.

5. The process of claim 1, in which during the treatment of the thorium-potassium double salt with a carbonate to precipitate thorium hydrocarbonate care is taken to provide for the presence, in the solution, of a percentage of potassium sulfate greater than the percentage of any other soluble sulfate.

6. The process of claim 1, in which the thorium potassium double salt is treated, for conversion into the insoluble potassium hydrocarbonate, with carbonate in excess of the calculated quantity such that the thorium compound first precipitated is redissolved, whereupon the solution is heated for the precipitation of colloidal iron hydroxide and, after removal of same, an acid is added to precipitate thorium hydrocarbonate.

KARL BÜCHNER.